No. 757,370.

Patented April 12, 1904.

UNITED STATES PATENT OFFICE.

CARL VILMAR, OF ZELLERFELD, GERMANY.

PROCESS OF MAKING MONOBENZOYL ARBUTIN.

SPECIFICATION forming part of Letters Patent No. 757,370, dated April 12, 1904.

Application filed October 24, 1902. Serial No. 128,649. (No specimens.)

*To all whom it may concern:*

Be it known that I, CARL VILMAR, apothecary, of Zellerfeld-on-the-Harz, in the Kingdom of Prussia, Germany, have invented a Process of Making Monobenzoyl Arbutin; and I do hereby declare the nature of this invention and in what manner the same is to be performed to be particularly described and ascertained in and by the following statement.

I have found that the mono combination of benzoyl with arbutin—a combination hitherto unknown—can be formed under certain conditions by the effect of benzoyl chlorid upon arbutin and splitting off of muriatic acid. If both substances are allowed to act upon each other while being simultaneously heated and a surplus of benzoyl chlorid applied, the arbutin will undergo decomposition under separation of sugar. However, if the reaction passes off in the cold or in low heat a combination will take place. From the product of the reaction the monobenzoyl arbutin is extracted in shape of a fine white powder by way of neutralization by means of alkali. The reaction may be elucidated by the following equation:

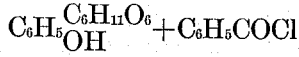

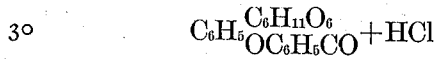

Upon this the process described hereinafter for the preparation of monobenzoyl arbutin is based.

About twenty-two parts of arbutin are dissolved in water and gradually mixed with ten parts of benzoyl chlorid in this way, that benzoyl chlorid is added in small quantities while being shaken and the mixture each time neutralized by means of alkali.

The combination monobenzoyl arbutin precipitates in shape of a white powder. The precipitate is to be collected, washed, and dried. In order to purify the substance, it is to be dissolved by boiling with water. When getting cold, it precipitates again in shape of fine needles. It is almost impossible to dissolve monobenzoyl arbutin in cold water.

Monobenzoyl arbutin is a specific for contagious diseases, particularly for pulmonary consumption.

The dose of monobenzoyl arbutin to be taken is one-tenth to one grain taken one to three times daily.

Having now particularly described and ascertained the nature of my said invention and in what manner the same is to be performed, I declare that what I claim is—

The process for the preparation of monobenzoyl arbutin by causing benzoyl chlorid to react upon arbutin and adding alkali to neutralize the product of the reaction.

In witness whereof I have hereunto set my hand in presence of two witnesses.

CARL VILMAR.

Witnesses:
JULIUS SECKEL,
FRIEDRICH DODT.